April 20, 1965   W. J. GREENE   3,179,786
TRACKING SYSTEM USING FLUX RELAXATION
Filed May 9, 1962   3 Sheets-Sheet 3

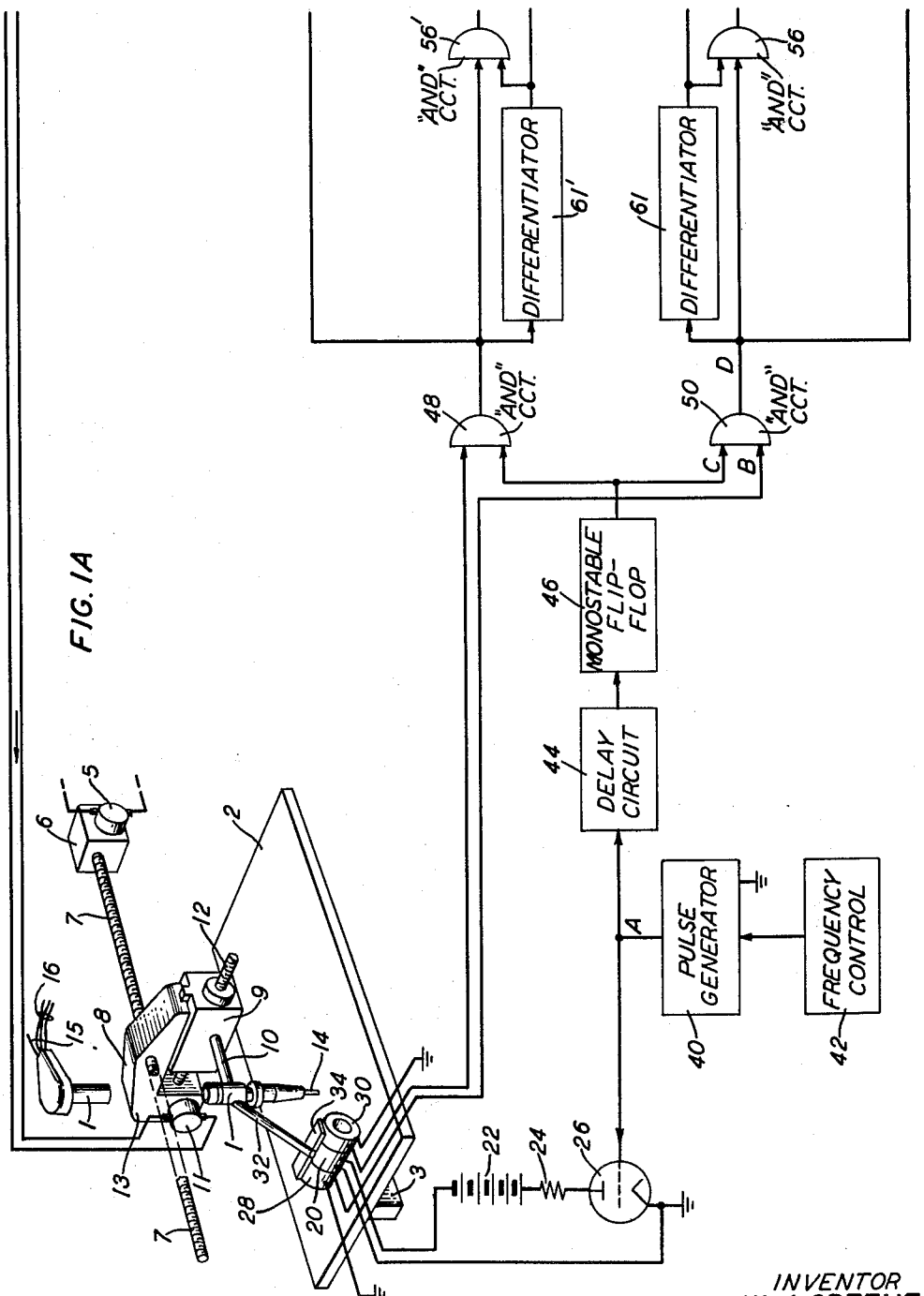
FIG. IA

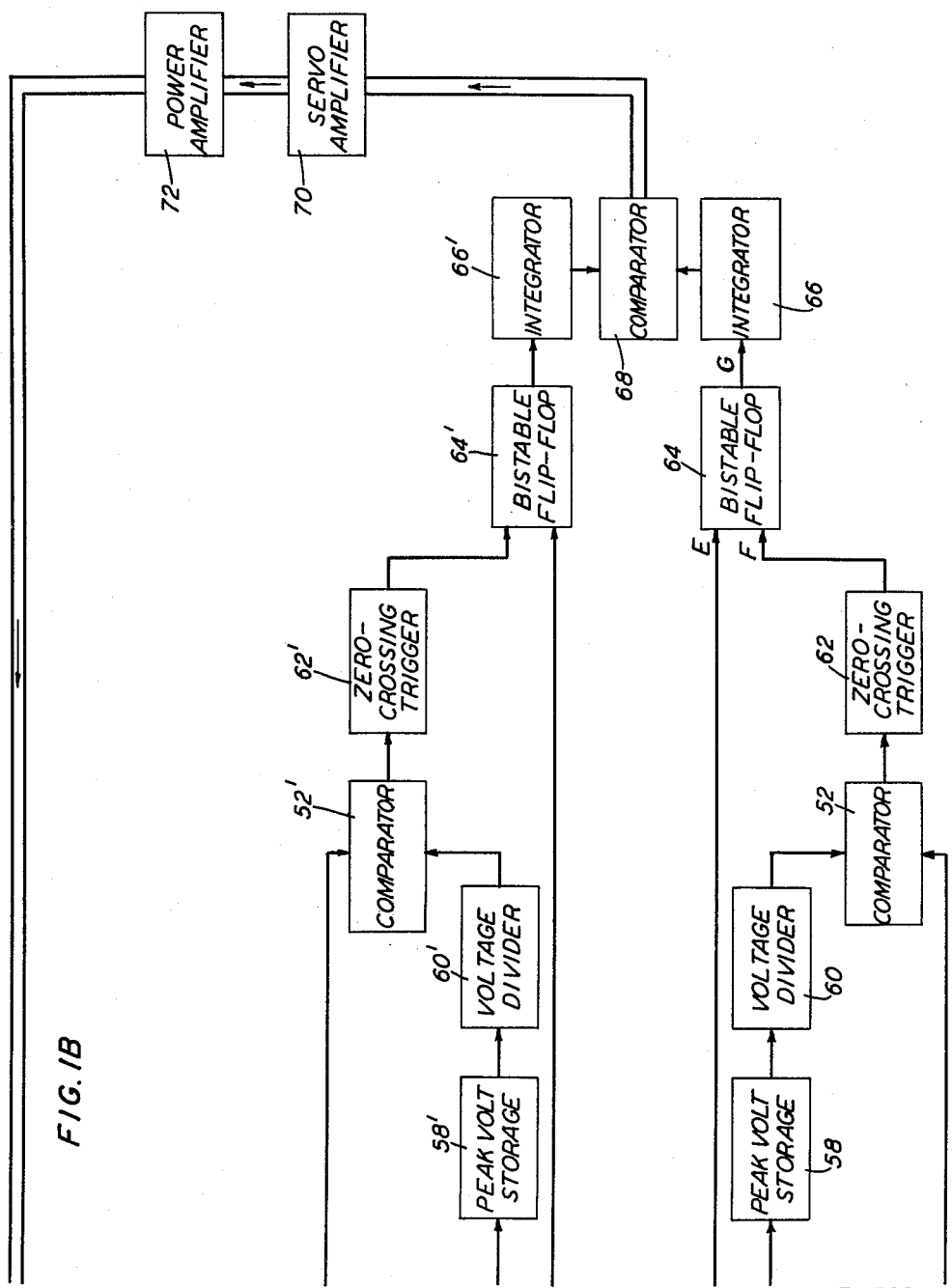

INVENTOR
W. J. GREENE
BY
Edmund W Bopp
AGENT

United States Patent Office 3,179,786
Patented Apr. 20, 1965

3,179,786
TRACKING SYSTEM USING FLUX RELAXATION
William J. Greene, Scotch Plains, N.J., assignor to Air Reduction Company, Incorporated, New York, N.Y., a corporation of New York
Filed May 9, 1962, Ser. No. 193,524
11 Claims. (Cl. 219—125)

This invention relates to electromagnetic tracking systems for following a line of discontinuity or irregularity in a workpiece of electrically conductive material, and more particularly to apparatus and methods for tracking by utilizing varying time rates of relaxation of magnetic flux induced in the workpiece.

A number of special problems arise with regard to electromagnetic tracking systems, among which is the problem of following the line of a rib or reinforcing member which is hidden or covered by an overlying member such as a plate. Another problem arises from a varying spacing between the workpiece and a sensing element as the workpiece is traversed by the sensing element, causing variations in the flux level at the sensing element, so that error in tracking may be introduced due to the variation in the response of the sensing element over different portions of the workpiece. Since variations in the spacing do not change the time constant of the flux decay process, the arrangements disclosed herein are not sensitive to proximity or to spacing from the workpiece. Other problems arise from differences in thickness of the material on opposite sides of the joint and from non-uniform thickness of material along the joint.

An object of the invention is to improve the effectiveness of electromagnetic tracking systems under these and other circumstances.

In butt joints, proximity of eddy currents to one of the abutting surfaces is an important factor in determining the flux decay rate. By regulating the depth of penetration of the flux in the workpiece a difference in thickness on opposite sides of the joint may be made to have little or no critical effect upon the flux decay rate, so that the difference in thickness is not a problem.

A further advantage of the invention lies in the fact that in tracking overlapping joints, such as lap joints, a single sensing element may suffice. The sensing element may be controlled to track along the center line of the lapper portion. The flux decay rate will be slowest at the center line and will become more rapid as the sensing element moves toward either edge of the overlapping portion.

The flux relaxation principle as applied herein to line tracking comprises sending an electromagnetic pulse into the interior of the conductive material of the workpiece whereby a system of eddy currents is set up in a restricted portion of the material. This requires that the exciting pulse be of sufficient duration to allow time for electromagnetic field to be transmitted or seep into the workpiece to the desired depth, which in some cases will be less than the entire thickness of the workpiece. For example, in the case of two metal plates of different thicknesses to be welded, it will usually be desirable that the field be extended only to the depth of the thinner plate. Where a rib is involved, the field should permeate well into the depth of the rib.

Upon termination of the transmitted pulse, one or more sensing elements are connected to a measuring system that is adapted to measure the time rate of decay of the electromagnetic field in the material of the workpiece and derive therefrom a signal to control a servo. When two sensing elements are used, provision is made to compare the measured time rates in the two elements and to provide a differential signal for controlling the servo. Due to the presence of the eddy currents, the field in the workpiece does not decay instantaneously, but falls off approxmiately exponentially at a rate determined by the time constant of the circuit which supports the eddy currents. The time constant depends in turn upon the effective values of inductance and resistance in the workpiece structure. In a manner similar to the way in which a laminated magnetic core reduces eddy currents as compared to a solid core, the strength of the eddy currents in the workpiece depends upon the shape and size of the metal parts in the vicinity of the place where the magnetic field is set up. So the strength of the eddy currents in the workpiece depends upon the proximity of the seam or other structural characteristic to the portion of the workpiece where the testing magnetic field is established. Generally speaking, the flux relaxation rate will increase as the sensing element moves closer to the metal boundary such as the side of a reinforcing rib or one face of an open seam. This is because the eddy currents become crowded into a more restricted portion of conductive material, analogous to a thin lamination, thereby increasing the resistance to the eddy currents and reducing their amplitudes. As a result, the magnetic field collapses more rapidly when the excitation ceases. The signal generated by the sensing element may be used to measure the time rate of decay of the flux. This measurement may be made to provide a control signal for a servo system that will move the tool and the sensing element transversely with respect to the desired track in the workpiece. In the usual manner, the servo may be adjusted to maintain the sensing element at a constant distance from the desired track. As the tool may be maintained at a fixed distance from the sensing element, the tool may be made to follow the line to be tracked.

In one embodiment of the invention, a transmitting element is provided for setting up the desired flux in the workpiece and two sensing elements are provided at equal fixed distances on either side of the tool. The servo is arranged to move the tool, the transmitting element, and the sensing elements as a unit in a line substantially at right angles to the line to be tracked. The usual feed mechanism is provided to move the workpiece and the servo-controlled tool and tracking assembly relatively to each other along the approximate track line.

As the tool progresses relatively to the workpiece, the transmitting element is pulsed in a succession of magnetizing pulses separated by intervals of no excitation. During each pulse of excitation, the field generated by the transmitting element seeps down into the material of the workpiece setting up regions of magnetic flux accompanied by systems of eddy currents. During each interval of no excitation, each sensing element generates a transient current by induction from the relaxing field in the material. Electronic circuits analyze the respective transient currents in the two sensing elements and compare the respective time rates of decay of the flux. Whenever the two rates differ, the system provides a control signal which energizes the servo to move the tool and tracking assembly transversely to the track line in the proper sense to restore the decay rates to substantial equality, thereby automatically causing the tool to track.

To follow a rib or a back-up plate that is hidden under a plate to which a tool such as a welding tool is to be applied, the length of the transmitting pulse may be adjusted to such value that during the pulse the flux will seep to the bottom of the rib or back-up plate. When the sensing element or elements are centered over the rib, the decay rate measured will have a definite value. Displacement of the sensing element to either side will in general cause a change in the decay rate, which change may be employed to control the servo to correct the position of the tool to follow the desired track.

Lap joints may be followed in similar manner by placing the sensing element or elements symmetrically with respect to the center of the lapped portion and utilizing changes in decay rate to control the servo to make the tool follow the desired track.

Other features, objects and advantages will appear from the following more detailed description of illustrative embodiments of the invention, which will now be given in conjunction with the accompanying drawings. In the drawings:

FIG. 1, comprising FIGS. 1A and 1B arranged end to end, is a schematic diagram of an embodiment of the invention;

Figure 2:
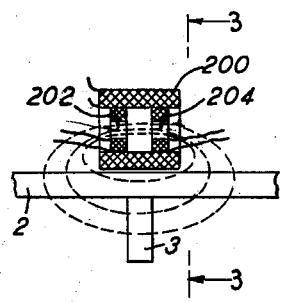
FIG. 2 is a cross-sectional elevational view of a modified form of a wave transmitting and sensing coil assembly shown in working relationship to a workpart assembly.

As shown in FIG. 1, a tool, illustrated as a welding torch 1, is mounted to traverse a workpiece plate 2 in the lengthwise direction of a partially hidden workpiece rib or flange member 3 by an electric motor 5 connected through gearing in a casing 6 to a lead screw 7 which extends generally in the direction of the rib. This lead screw 7 imparts motion to a carrier 8 which acts as a support for a slide 9 on which the welding torch 1 is mounted by a bracket 10. The slide 9 is movable crosswise of the rib 3 relative to its carrier 8 by an electric motor 11 which imparts rotation to a cross-adjusting screw 12 with which it is connected through gearing in a casing 13 which may be integral with the carrier 8 or attached thereto. The cross-adjusting screw 12 makes a threaded engagement with the slide 9. The arrangement is such that rotation of motor 11 in either direction will adjust slide 9 relatively to its carrier 8 to position the welding torch 1 laterally of the rib 3 as it is traversed lengthwise thereof by the electric motor 5 acting through its gear transmission in casing 6 and lead screw 7 which engages and drives carrier 8. The electric motor 5 is connected, as indicated, to a source of supply by means of which its speed and direction of rotation are controlled to traverse the welding torch 1 along the portion of the upper face of the workpiece 2 immediately above the rib 3. It is of course understood that the parts of the machine just described are suitably supported relatively to one another and to the workpiece and rib by other members of the machine which for clarity of illustration have not been shown. Also the workparts such as the plate 2 and rib 3 may be held in assembled relationship in a clamp or clamps forming part of the machine or forming part of a jig which may be positioned in the machine or the machine may be positioned on or over the workparts which are otherwise assembled as by tack welding at spaced positions along the rib.

Any suitable welding agency may be employed and I have illustrated an inert arc welding torch which may have the construction illustrated and described in United States Letters Patent 2,512,705, Nelson E. Anderson and George R. Turbett, granted June 27, 1950 and entitled "Fluid-Cooled Gas-Blanketed Arc Welding Torch." Welding current is supplied to the electrode 14 of this torch through a welding cable 15 and cooling fluid and inert shielding gas are supplied thereto through hoses 16.

The welding torch 1 is centered over the rib 3 by a signal producing means which is sensitive to the instantaneous relative values of time rate of decay of electromagnetic flux on opposite sides of the centerline of the rib. The electromagnetic flux in the plate and rib may be set up by means of a transmitting coil 20 supplied with pulses of current from a source of direct current, illustrated as a battery 22, through a circuit including a load resistor 24 and the anode-cathode path of a space discharge triode 26. The signal producing means above mentioned may comprise pick-up coils 28 and 30 which may be mounted on either side of the transmitting coil 20. The latter coil is mounted a little in front of the welding agency 1 and may be supported either from the slide 9, or from the torch 1 as by means of a rod or bracket 32 and a bar 34, which latter member may also support the pick-up coils 28 and 30. This arrangement has been chosen for illustration in the drawing because it facilitates a clear showing of the spatial relationship of the tool and the tracking coils, although in practice a more compact arrangement may be had by supporting the coils from the forward face of the slide 9 and supporting the tool from the rearward face of the slide by suitable brackets. In the arrangement illustrated, the pick-up coils are positioned at equal distances on opposite sides of the line of travel of the torch 1 with their axes aligned with each other and parallel to the plate 2 and also perpendicular to the lead screw 7. The pick-up coils may be electrically of like construction so that equal electromagnetic fluxes linked thereby induce equal voltages in these coils.

The space discharge triode 26 is actuated as a switch by means of periodic pulses supplied to its grid electrode from a pulse generator 40. The generator 40 is made adjustable as to the pulse repetition rate as by varying some parameter of the generator, such as a capacitance or a resistance in the timing circuit of the generator. The generator 40 may be a bistable multivibrator or flip-flop circuit. The pulse repetition rate control is represented diagrammatically in the figure as a frequency control element 42. The generator 40 may be arranged to impress positive pulses upon the grid of the tube 26 alternating with periods constituting negative pulse periods during which the grid is grounded or at least sufficiently less positive to interrupt the anode-cathode current of the tube 26 between periods of conduction. The positive pulses should generally be made of less duration than the negative pulses, since the desired flux may be excited in a brief period by applying a large magnetomotive force and the flux decay rate may best be measured during a relatively long period of flux decay. Also connected to the output side of the generator 40 is a delay circuit 44 followed by a monostable flip-flop circuit 46. The flip-flop circuit 46 is so arranged that after the beginning of a negative-going portion of a pulse from the generator 40 and immediately following a delay of a fraction of the pulse duration in the delay circuit 44, the flip-flop 46 initiates a pulse in its output circuit. The duration of this latter pulse is determined by the internal adjustment of the flip-flop 46 to be somewhat less than the duration of the negative pulse from the generator 40. Output pulses from the flip-flop 46 are impressed substantially simultaneously upon input circuits of a pair of logical and-circuits 48 and 50.

During the positive going portion of a pulse from the generator 40, direct current is supplied to the transmitting coil 20 to develop electromagnetic flux which spreads out quickly in the air but more slowly in the metal of the workpieces wherein its progress is slowed by the formation of a system of eddy currents in the metal which induce counter fluxes which delay the building up of the flux toward its final steady value. As a result of the delay in establishing the flux in the metal, the effect is a gradual seeping of the flux into the metal pieces until the flux reaches the desired depth. The duration of the positive pulse from the generator 40 is preferably approximately only long enough for the flux to reach the desired depth of penetration. Usually it will be desirable that a steady-state condition shall not be attained.

When the positive pulse comes to an end, the flux immediately begins to collapse. In the air, this collapse is completed very rapidly, but in the metal parts the eddy currents persist for some time, thereby slowing down the collapse of the flux. The time required for the flux to collapse in the plate 2 will be less than the time required for the flux to collapse in the rib 3, due to the greater depth of the rib and the resultant greater strength of the eddy currents in the rib compared to those in the plate. The collapsing flux induces pulses in the pick-up coils 28 and 30, which start out at a relatively high strength and die down approximately exponentially with time. The rate of decay of the exponential pulses depends upon the rate of collapse of the flux and is less rapid over the region of the plate 2 that covers the rib 3 than over the regions of the plate on either side of the rib.

Illustrative apparatus and method will now be described for measuring the time rate of decay of the pulses induced in the pick-up coils 28 and 30. The pulse from coil 28 is impressed upon the input circuit of the and-circuit 50. During a portion of the duration of the pulse from coil 28, the flip-flop 46 impresses a coincidental pulse upon the input of the and-circuit 50. During the coincidence of these pulses, the and-circuit 50 transmits the exponential pulse or a replica thereof to one side of a comparator 52, to an and-circuit 56 and to a differentiator 61. The differentiator 61 generates a brief pulse which is impressed upon the and-circuit 56 and also upon a bistable flip-flop 64. The and-circuit 56, when actuated by the coincidence of the exponential pulse and the gating pulse from the differentiator 61, briefly connects the exponential pulse to a peak-voltage storage circuit 58. During this brief period the exponential pulse and a voltage storage element within the device 58 come to the same voltage value, preferably substantially the instantaneous value of the voltage of the exponential pulse at the instant of connection. Between gating pulses from differentiator 61 the storage element in the device 58 holds substantially to the voltage value given to it by the preceding exponential pulse. A voltage divider 60 assumes and holds a voltage value that is a predetermined fraction of the peak voltage stored by the device 58. This fraction may be 1/e, where e is the base of natural logarithms, but other fractional values may be used.

The brief pulse from the differentiator 61 which is applied to the input of the bistable flip-flop 64 serves to set the flip-flop, thereby registering the start of a measuring period during which the system is to measure the time required for the exponential pulse to decay from an arbitrary initial value at the instant of the brief pulse to a predetermined fraction of that initial value as determined by the voltage divider 60.

The fractional voltage value from the divider 60 is impressed upon the comparator 52 along with the exponential pulse from the and-circuit 50. The value of the voltage of the exponential pulse decreases with time, and when this value falls to the value established by the voltage divider 60, the comparator 52 actuates a zero-crossing trigger 62 which is connected to the comparator. The trigger 62 applies a resetting pulse to reset the bistable flip-flop 64, thus recording the finish of the time period during which the exponential pulse has decayed from an arbitrary initial amplitude to a predetermined fraction of that initial amplitude. The shorter this time period the more rapid is the time rate of flux decay and, vice versa, the longer this time the less rapid is the time rate of flux decay.

Substantially simultaneously with the application of a pulse from coil 28 to the and-circuit 50, a pulse is impressed upon the and-circuit 48 from the coil 30. The and-circuits 48 and 50 are triggered substantially simultaneously by the flip-flop 46. Elements 56', 58', 60', 61', 62' and 64' are provided which are substantially duplicates of the elements 56, 58, 60, 61, 62 and 64, respectively, for making a measurement of the time rate of flux decay in the coil 30 in the same manner as has been described for the measurement of the time rate of flux decay in the coil 28. The time periods registered by the flip-flops 64 and 64' begin substantially simultaneously under the control of the flip-flop 46, but these periods will be of unequal length whenever there is any inequality in the time rates of flux decay in the two coils 28 and 30.

To provide a control signal to operate the motor 11 to move the torch 1 laterally to center it over the rib 3, use may be made directly of the difference in duration of the pulses from the flip-flops 64 and 64'. The two pulses may be made to cancel each other during their period of overlap, and the remaining portion of the longer pulse may constitute a control pulse. Alternatively, according to an arrangement shown in the illustrated embodiment, each pulse may be separately integrated and the integrated values may be compared in order to generate a control signal of the proper sense to control the motor 11 to center the tool. In the figure, the flip-flops 64 and 64' are shown connected respectively to integrators 66 and 66'. The output signals from these integrators are impressed upon a comparator 68. The signal from the comparator is impressed upon a servo amplifier 70 which in turn controls a power amplifier 72 which supplies power currents of the proper sense to the motor 11.

The electrical elements shown in block form in FIG. 1 are individually well known in the art of electrical pulsing and control and for that reason it is thought not to be necessary to describe any of them in further detail herein. The invention lies in the particular manner in which the known elements are combined to accomplish the desired results. For details of suitable component devices reference may be made to the "Handbook of Automation, Computation, and Control," volume 2, edited by E. M. Grabbe, Simon Ramo, and D. E. Wolldridge, and published by Wiley & Co., 1959.

Figure 3:
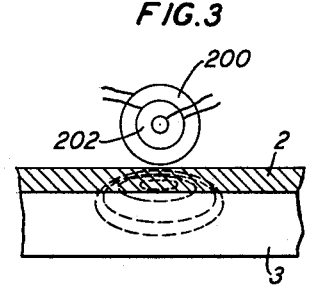
FIG. 3 is a cross-sectional view of the assemblies of FIG. 2 taken along the line 3—3 in FIG. 2.

FIG. 2 shows in elevational cross-sectional view another suitable configuration of a transmitting coil 200, pick-up coils 202, 204, and workpieces 2, 3, which may be used in place of the arrangement shown in FIG. 1. A side view of the arrangement of FIG. 2 is shown in FIG. 3. In these figures, the pick-up coils 202, 204 are arranged concentrically inside the transmitting coil 200 with a separation between them of about the width of the rib 3 so that the flux will be strong near the side surfaces of the rib when the coils are centered over the rib, and so that when off center the flux from one coil will be mainly in the rib and the flux from the other coil will be mainly in the plate. The dotted lines in FIG. 2 represent flux lines when the flux has been established and before it has begun to decay. In FIG. 3, the dotted lines represent eddy current paths in the plate and rib.

Figure 4:
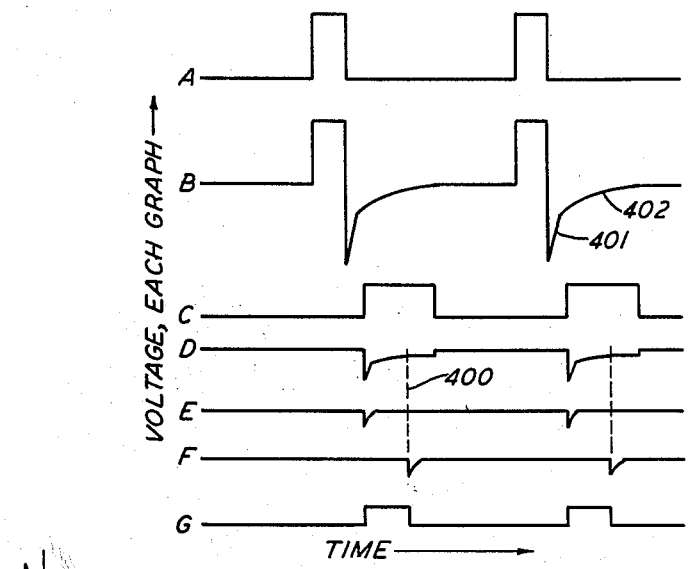
FIG. 4 is a set of graphs showing illustrative waveforms which may be present at various points in the system of FIG. 1.

FIG. 4 shows approximate waveforms which will be found at various specified points in the system of FIG. 1 when operated as described herein. The graphs of the wave forms are designated A to G inclusive and corresponding points to which the graphs relate are marked in the lower portion of FIG. 1. Except for the possible difference in duration of the decay period, FIG. 4 applies equally well to a similar set of points in the upper portion of FIG. 1.

Graph A shows the wave from the generator 40. Graph B shows the exponential type of wave derived from the pick-up coil 28. During the positive-going portion of the wave of A the transmitting coil 20 is sending the flux impulse into the workpiece. During this period, the pick-up coils generate positive-going pulses as shown in graph B, but since the and-circuit 50 is not energized at this time, this part of the wave in B is not passed into the measuring circuit. Graph C shows the gating pulse as generated by the flip-flop 46. Due to the delay in the delay circuit 44, this gating pulse begins shortly after the start of the declining portion of the wave at B. Immediately following the end of the positive-going portion of the pulse, the part of the flux that is in the air decays at an extremely rapid rate compared to the rate of decay of the flux in the metal. This rapid decay generates a very steep initial decline at 401 as shown in graph B, which would tend to introduce error in the measuring system if allowed to come through. The gate pulse in C is preferably started after this initial decline in B is completed, the less steep portion 402 shown in B. Graph D shows the portion of the wave in C that is passed to the measuring circuit by the and-circuit 50. It will be noted that the portion passed occurs during the decay of the flux and not during the rise of the flux. Graph E shows the pulse which sets the flip-flop 64 to mark the beginning of the measured time interval that determines the time rate of decay of the flux. This pulse is a short marker pulse generated by the differentiator 61 when the wave in D first reaches the differentiator. Graph F shows the short marker pulse that is generated in the zero-crossing trigger 62 at the instant indicated by vertical dotted line 400, when the voltages applied to the comparator 52 are equal, thus marking the end of the measured time interval that determines the time rate of decay of the flux. The pulse from the wave in F resets the flip-flop 64. Graph G shows the duration and approximate wave shape of the pulse generated by the flip-flop 64 representing by its duration the time rate of decay of the flux.

Figure 5:
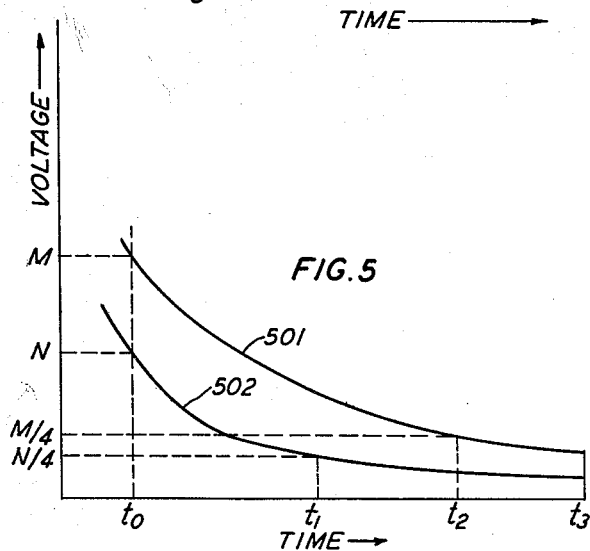
FIG. 5 is a set of graphs useful in conjunction with FIG. 4 in explaining the operation of the invention.

The operation of the comparators 52 and 52′ in obtaining measurements of time rate of flux decay irrespective of amplitude of response in the sensing element is shown graphically in FIG. 5. In the figure, voltage is shown as a function of time. Curve 501 shows a portion of a representative response of one of the coils 28 or 30 as applied to the comparator 52 or 52′ as the case may be. Curve 502 shows a portion of a representative response of the other coil as applied to its respective comparator. As illustrated, the curves 501 and 502 may differ in both amplitude and slope or rate of decay. At time $t_0$, curve 501 is shown as having amplitude M while curve 502 at this time has amplitude N. Time $t_0$ represents the instant at which the differentiators 61 and 61′ are actuated to set the respective flip-flops 64 and 64′ to mark the start of a measuring period. The voltage M is recorded by the peak voltage storage element 58. A fraction of M, illustrated in FIG. 5 as one-quarter, is set up by the voltage divider 60 and applied to the side of the comparator 52 opposite the voltage represented by curve 501. At time $t_2$, curve 501 has fallen to the value $M/4$ marking the end of the measuring period for the curve 501. At time $t_2$, the trigger 62 is actuated to reset the flip-flop 64. At time $t_1$, curve 502 has fallen to the value $N/4$ marking the end of the measuring period for the curve 502. It will be evident from the figure that the time intervals measured between $t_0$ and $t_1$ and between $t_0$ and $t_2$ do not depend upon the amplitudes M and N nor upon the relative values of M and N. It will also be evident that the two measuring periods are not required to start at exactly the same time $t_0$ but may start at different times although it will usually be convenient to start the periods approximately simultaneously under the control of the single flip-flop 46. Time $t_3$ in FIG. 5 represents the cutting off of the waves represented by curves 501 and 502 at the end of the gating pulse from the flip-flop 46 when the and-circuit 50 is deactivated.

It will be understood that in certain instances a single pick-up coil may be used instead of the pair of coils 28, 30. In that case the response of the single coil will vary in accordance with the time rate of decay of the flux in the workpiece as in the case of each of the coils 28, 30. The variation of response in the single coil may be used directly to control the tracking or the varying response of the coil may be compared to a constant reference value to produce a control in known manner. It will be apparent that a single coil may serve both as a transmitting device for establishing flux in the workpiece and to pickup induction from the decaying flux in the workpiece between periods of flux build-up. In that case provision may be made in known manner to avoid sending a pulse from the coil to the measuring circuits during the flux build-up period and to connect the coil to the measuring circuits during the period of flux decay.

It will also be understood that other methods and apparatus for measuring the time rate of flux decay may be substituted for the method and apparatus illustrated herein for that purpose, since many forms of such methods and apparatus are known in the art.

In case two plates of different thicknesses are to be butt-welded, the depth of penetration of the flux should be adjusted to no more than the thickness of the thinner plate. The fluxes in the two plates will then have approximately equal decay rates and the extra thickness of the thicker plate will not introduce appreciable error into the tracking.

It is apparent that the pick-up coils 28 and 30 need not be electrically alike so that like voltages are induced therein by like changes of magnetic flux. If unlike coils are employed, the time rate of decay of the response will not be affected. Although air core coils have been illustrated in the drawings, it is apparent that cores of magnetic material, for example, ferrites, may be used and may be provided with suitable pole pieces for guiding the flux into a desired portion of the workpiece.

It is also apparent that the control is not necessarily limited to positioning a welding agency over a seam to be welded but that it may be used for positioning any tool or instrumentality relative to any line of discontinuity upon any workpiece upon which the tool is arranged to act as it is traversed lengthwise of the line to be tracked. The construction of the machine by means of which the welding agency or tool is traversed along a track and centered relatively thereto may be variously modified without departing from the spirit and scope of the invention. In application of the invention to welding it is apparent that any welding torch of suitable construction may be used as the welding agency.

Other mechanical arrangements for providing a universal relative movement between the workparts and the assembly of welding agency or tool and flux sensing means associated therewith may be substituted for the particular arrangement diagrammatically illustrated in the drawings. Thus the workparts in assembled relation may be moved bodily relatively to a stationary welding agency or tool and the flux sensing means associated therewith to position the tracking line on the workparts directly under the welding agency or tool as the workparts are traversed.

While illustrative forms of apparatus and methods in accordance with the invention have been described and shown herein, it will be understood that numerous changes may be made without departing from the general principles and scope of the invention.

What is claimed is:
1. In tracking apparatus, in combination,
 (a) means to establish a localized region of electromagnetic field within a body of conductive material in a workpiece,
 (b) means to measure the time rate of decay of said electromagnetic field upon cessation of energization of said field establishing means, and
 (c) means responsive to the value of said measured decay rate to perform a control function to effect a desired spatial relationship between said workpiece and a tool operative upon said workpiece.
2. In tracking apparatus, in combination,
 (a) means to establish a localized region of electromagnetic field within a body of conductive material in a workpiece, said means being located adjacent to a boundary surface of said conductive material,
 (b) means to measure the time rate of decay of said electromagnetic field upon cessation of energization of said field establishing means, and (c) means to move said field establishing means substantially at right angles to said boundary surface, said moving means being responsive to the value of the measured time rate of decay of the electromagnetic field.

3. In tracking apparatus, in combination, (a) tool holding and moving means movable relatively to a workpiece which includes a body of conductive material, (b) means movable with said tool holding and moving means for establishing a localized region of electromagnetic field within said body of conductive material, said means being located adjacent to a region of discontinuity of said body of conductive material, (c) further means movable with said tool holding and moving means for sensing the decay of said electromagnetic field upon cessation of energization of said field establishing means, (d) means to measure the time rate of decay of said electromagnetic field as sensed by said sensing means, and (e) means responsive to the value of the measured time rate of decay of the electromagnetic field for moving said tool holding and moving means together with the said means movable therewith, said movement being relative to said region of discontinuity of said body of conductive material.

4. In line tracking apparatus, in combination, (a) means to transmit into conductive material of a workpiece an electromagnetic pulse of time duration sufficiently long to allow the electromagnetic field of said pulse to permeate a material volume of said material, (b) means to disable said transmitting means for a period of time following said pulse, (c) means active substantially solely during said non-transmitting period to measure the time rate of decay of the said electromagnetic field within said material, and (d) means responsive to the value of said measured decay rate to perform a control function to effect a predetermined mutual relationship between said workpiece and a tool operative upon said workpiece.

5. In line tracking apparatus, in combination, (a) means to provide relative motion between a tool and a workpiece substantially at right angles to a structural irregularity in said workpiece forming a path to be tracked, (b) an electromagnetic transducing means mounted in substantially fixed spatial relationship to said tool and adjacent to said structural irregularity in said workpiece, (c) means active substantially solely during a first time interval for energizing said transducing means to transmit an electromagnetic pulse into a conductive portion of said workpiece, said first time interval being sufficiently long to allow the electromagnetic field of said pulse to permeate a predetermined thickness of said conductive portion, (d) means active substantially solely during a second time interval immediately following said first time interval responsive to an electromagnetic pulse induced in said transducing means by collapse of said electromagnetic field in said conductive portion of said workpiece for measuring the time rate of decay of said collapsing field, and (e) means responsive to the value of said measured decay rate to actuate said relative motion producing means to control said relative motion and thereby to control the spatial relationship between said tool and the said path to be tracked.

6. In tracking apparatus, in combination, (a) means to provide relative motion between a tool and a workpiece, substantially at right angles to a structural irregularity in said workpiece forming a path to be tracked, (b) a plurality of electromagnetic transducers each mounted in substantially fixed spatial relationship to said tool and substantially symmetrically disposed with respect to said tool in a direction transverse to said path to be tracked, (c) means active substantially solely during a first time interval for energizing at least one of said transducers to make said transducer transmit an electromagnetic pulse into a conductive portion of said material on opposite sides of said path to be tracked, said first time interval being sufficiently long to allow the electromagnetic fields of said pulses to permeate a predetermined material thickness of said respective conductive portions, (d) means active substantially solely during a second time interval immediately following said first time interval and responsive to electromagnetic pulses induced in at least two of said transducers by the collapse of said electromagnetic fields for measuring the time rate of decay of said collapsing fields, (e) means to compare the said measured time rates of decay to generate a difference signal responsive to the difference between said rates, and (f) means responsive to said difference signal to actuate said relative motion producing means to control said relative motion and thereby to control the spatial relationship between said tool and the said path to be tracked.

7. In tracking apparatus, in combination, (a) means to establish a localized region of electromagnetic field within a body of conductive material in a workpiece, said means being located adjacent to regions of unequal thicknesses of said conductive material, (b) means to measure the time rate of decay of said electromagnetic field upon cessation of energization of said field establishing means, and (c) means to move said field establishing means relatively to said regions of unequal thicknesses of conductive material, said moving means being responsive to the value of the measured time rate of decay of the electromagnetic field.

8. The method of seam tracking which comprises the steps of (a) transmitting an electromagnetic field into a conductive portion of a workpiece in the neighborhood of the seam to be tracked, (b) measuring the time rate of decay of said field upon cessation of transmission of said field, (c) repeating said first two steps at successive locations along the general direction of the seam to be tracked, and (d) tracking the seam by means of measured differences in said time rate of decay.

9. The method of seam tracking along a path formed by a structural irregularity in a conductive portion of a workpiece, which method comprises the steps of (a) moving tracking apparatus along the general line of the said path, (b) alternately transmitting an electromagnetic field into said conductive portion of the workpiece in the neighborhood of said structural irregularity and measuring the time rate of decay of said field upon cessation of transmission, and (c) tracking the seam by means of measured differences in said time rate of decay.

10. The method of seam tracking for a butt weld between plates of different thicknesses, which method comprises the steps of (a) transmitting a magnetic field into said plates on both sides of the seam, (b) interrupting said transmitting step when the said field in both said plates has penetrated to a depth not materially greater than the thickness of the thinner of said plates, (c) comparing the time rates of flux decay on the two sides of the seam during collapse of said field, and (d) tracking the seam by means of measured differences in said time rates of flux decay.

11. The method of seam tracking for a weld between a plate and a backing member beneath said plate, said method comprising the steps of (a) transmitting a magnetic field into said plate and said backing member, (b) interrupting said transmitting step when the penetration of said field has reached a depth substantially equal to the combined depth of said plate and said backing member, (c) comparing the time rates of flux decay at different locations in the neighborhood of the seam, during collapse of said field, and (d) tracking the seam by means of measured differences in said time rates of flux decay.

References Cited by the Examiner

UNITED STATES PATENTS

| | | | |
|---|---|---|---|
| 3,021,419 | 2/62 | Rascati et al. | 219—124 |
| 3,076,889 | 2/63 | Enk | 219—125 |

RICHARD M. WOOD, *Primary Examiner*.